United States Patent Office 3,341,502
Patented Sept. 12, 1967

3,341,502
PROCESS FOR THE PREPARATION OF POLYMERS CONTAINING ISOCYANATES
Gottfried Pampus and Hans Holtschmidt, Leverkusen, and Helmut Freytag, Cologne-Stammheim, Germany, assignors to Farbenfabriken Bayer Aktiengesellschaft, Leverkusen, Germany, a corporation of Germany
No Drawing. Filed Feb. 17, 1965, Ser. No. 433,469
Claims priority, application Germany, Feb. 27, 1964, F 42,144
12 Claims. (Cl. 260—79.5)

This invention relates to isocyanates, particularly to sulfur-containing isocyanates and more particularly polymers containing isocyanate groups and to a method for preparing the same.

Heretofore, isocyanates and processes for the preparation of isocyanates containing thioether groups were known in the literature (see Annalen der Chemie, vol. 562, page 75, and DBP 1,119,853). In these processes, the corresponding amino compounds were reacted with phosgene by the classical methods of isocyanate chemistry. However, for many reasons, it is desirable to introduce the NCO group into the molecule under very mild conditions. This applies particularly to compounds containing thioether groups, tertiary nitrogen atoms, ester groups of tertiary alcohols, and many other groups which undergo decomposition or undesirable side reactions in the presence of heat, phosgene, and/or hydrogen chloride gas.

Likewise, it was found desirable to introduce NCO groups into polymeric material containing a plurality of olefinic and acetylenic C—C bonds. Even though several processes are known for preparing polymers which contain isocyanate groups, none of these processes are useful for introducing isocyanate groups into polymers which do not contain hydrogen atoms capable of reacting with NCO groups.

Therefore, it is an object of this invention to provide a method for preparing sulfur-containing isocyanates. Another object of this invention is to provide a method for preparing isocyanates containing a thioether group. Still another object of this invention is to provide a method for preparing isocyanates containing a thioether group from sulfenyl halide isocyanates. A further object of this invention is to provide a method for preparing polymers containing isocyanate groups. A still further object of this invention is to provide a method for introducing isocyanate groups into polymers. A still further object of this invention is to provide a method for introducing isocyanate groups into polymers which do not contain hydrogen atoms capable of reacting with NCO groups.

These and other objects which will become apparent from the following description are accomplished in accordance with the invention, generally speaking, by subjecting, in a first step, isocyanates containing a disulfide group in the molecule to halogenolysis to produce sulfenyl halide isocyanates and thereafter reacting, in a second step, the thus obtained sulfenyl halide isocyanates with unsaturated high molecular weight organic compounds having a plurality of olefinic or acetylenic C—C bonds. In other words, it has been found that high-molecular weight compounds containing isocyanate groups or isocyanate-donor groups can be prepared in a simple manner by reacting high-molecular compounds, which contain a plurality of olefinic or acetylenic C—C bonds and have a mean molecular weight about 1000, with sulfenyl halide isocyanate or with substances capable of yielding those.

The isocyanates containing a sulfenyl halide group obtained by treating a disulfide-containing isocyanate in the first step of the above process may be represented by the following general formula:

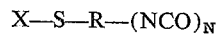

wherein R is a divalent organic radical having from 1 to 16 carbon atoms and N is 1 or 2. Thus, R in the above formula may be substituted or unsubstituted and many be analkylene radical, an arylene radical, an alkarylene radical, an aralkylene radical, and so forth. Aromatic radicals are preferred. X is a halogen radical having an atomic number between 17 and 35, inclusive. Other substituents which may be connected to the organic group R above are halogen groups, nitro groups, alkyl groups, cycloalkyl groups, alkoxy groups, aralkoxy groups and cycloalkoxy groups. In addition to the above groups, sulfide radicals containing alkyl, aryl, or cycloalkyl groups may also be connected to R above.

It has now been found that polymers containing isocyanates and having thioether groups therein can be obtained in a smooth reaction without having to employ the vigorous reaction conditions associated with phosgenation of the corresponding amines, by first forming sulfenyl halide isocyanates by halogenolysis of isocyanates having a disulfide group in the molecule and thereafter reacting the sulfenyl halide isocyanates with a high molecular weight unsaturated organic compound.

Isocyanates having a sulfenyl halide group have not hitherto been known. Surprisingly, the preparation of the sulfenyl halide isocyanates and their stability was completely unexpected as a matter of course. It was known that, for example, ketenes, which in many cases behave like analogues of isocyanates (see Angewandte Chemie, A 59, page 257 (1948), Annalen der Chemie, vol. 602, pages 1 et seq. (1957)), react very easily with sulfenyl chlorides, as illustrated by the following equation:

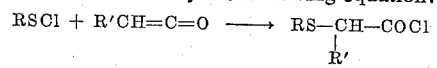

Furthermore, it was known that sulfenyl halides react readily with compounds which have a certain CH acidity (e.g., with phenols, phenol ethers, dimethylaniline, aromatic hydrocarbons), which results in the splitting off of HCl and the formation of thioethers (see Houben-Weyl, vol. 9, page 277, and vol. 85, page 338 (1952)). Since NCO groups on the aryl nucleus also act as positive substituents to activate the hydrogen atoms on the nucleus, it was to be expected that condensation would also take place between the SCl group and the activated aryl nucleus and that, consequently, the aryl isocyanates which contain sulfenyl halide groups would at least be very unstable. Contrary to all expectations, these side reactions were not observed, or at least not to any significant extent. Instead, by the action of halogenating agents on isocyanates which contain a disulfide group in the molecule, the corresponding sulfenyl halide isocyanates are obtained in excellent yields.

In the preparation of sulfenyl halide isocyanates, the isocyanates containing a disulfide group in the molecule is contacted with halogen-containing compounds at a temperature preferably below 70° C. in the absence of moisture. Some of the disulfide isocyanates that can be used for halogenolysis are known in the literature, and that regard see "Annalen der Chemie," vol. 562, page 75 (1949), and others are obtainable by the classical methods of isocyanate chemistry. The following are representative compounds of the type of disulfide isocyanates which may be used:

(a) 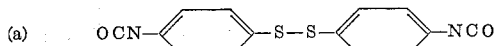

(b) 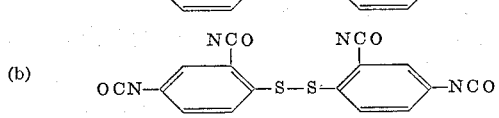

(c) 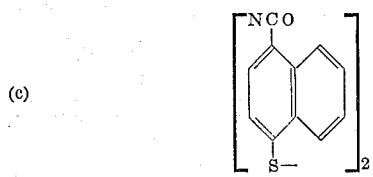

(d) 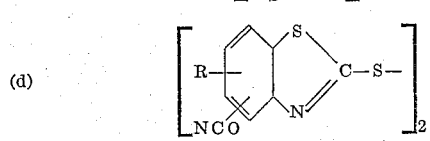

(e) 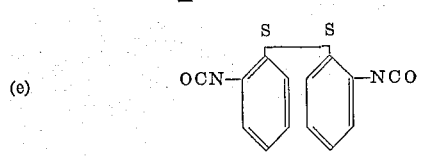

(f) 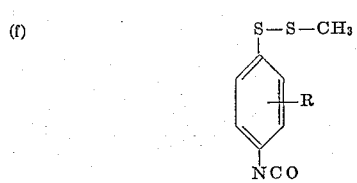

where R is hydrogen, halogen, nitro or an alkyl group having from 1 to 8 carbon atoms, a cycloalkyl group having from 7 to 12 carbon atoms, or —OR' or —SR', and where R'=an alkyl group having from 1 to 8 carbon atoms, an aryl group, or a cycloalkyl group having from 7 to 12 carbon atoms.

(g) 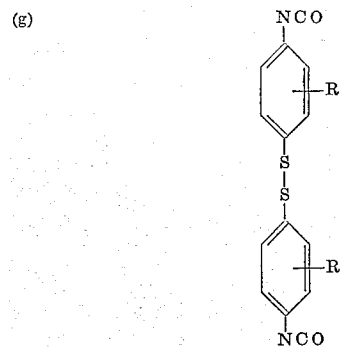

where R is hydrogen, halogen, nitro, or an alkyl group having from 1 to 8 carbon atoms, a cycloalkyl group having from 7 to 12 carbon atoms, or —OR' or —SR', where R' is defined above.

(h) OCN(CH₂)₂—S—S—(CH₂)₂—NCO (i) OCN—CH₂—CH—S—S—CH—CH₂—NCO
         |              |
         R₁             R₂ where $R_1$ and $R_2$ may be the same or different and represent an aryl group or an alkyl group having 1 to 8 carbon atoms.

It is also possible for the process of this invention to use reaction products of mono or polyhydric alcohols with an excess of isocyanates. In other words, compounds which contain a urethane group in the molecule in addition to an NCO group. Such compounds may be illustrated by the following formula:

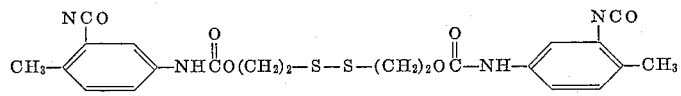

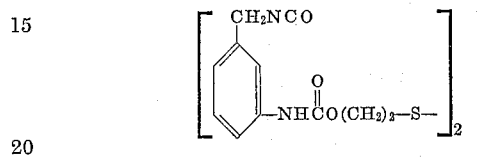

In the case of the above formula, surprisingly it was found that the urethane group was not attacked by the halogenating agent.

Also, sulfides which contain the NCO group in a masked form from which it can be liberated by heating so called isocyanate splitting compounds, may also be used in the process of this invention. Examples of such compounds are reaction products with phenols, tertiary alcohols, esters of malonic acid and acetoacetic acid, hydrocyanic acid and compounds which contain a uretdione group (dimeric isocyanates), e.g. compounds of the following constitution:

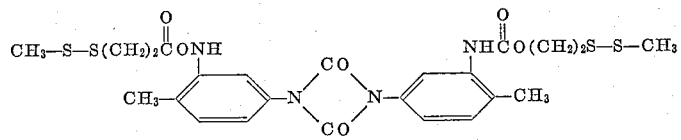

Surprisingly, here again, the masked NCO group was not attacked by chlorine.

In the halogenolysis of the disulfide isocyanates it is possible to use halogenating agents such as chlorine and bromine as well as both corresponding sulfuryl halides, phosphorous pentachloride and phosphorous pentabromide. However, it is preferred that chlorine be employed. It was found that iodine and fluorine were not suitable for the preparation of the corresponding sulfenyl halides.

The usual reaction conditions are used for the halogenolysis of the disulfide compound to the sulfenyl halide. The reaction is effected in the cold, preferably at a temperature of from about —50° C. to a temeprature of about +70° C.; however, temperatures as high as 200° C. may be used in certain cases. It is preferred that the reaction be effected in the absence of moisture in order to avoid substitution reactions by the halogens. Also in some cases it is advisable to avoid the action of light during halogenolysis in order to prevent halogen substitution reactions.

The reaction may be effectuated in the presence or absence of solvents. It is preferred that the reaction between the isocyanate containing disulfide group and the halogen be effected in the presence of an inert organic solvent such as aliphatic and aromatic solvents as well as halogenated aliphatic and aromatic solvents. Examples of suitable solvents are halogenated hydrocarbons such as carbon tetrachloride, chloroform, methylene chloride and dichloroethane, dichlorobenzene and the like. Aromatic compounds and petroleum fractions may also be used.

In the preparation of polymers containing isocyanate groups, the sulfenyl halide isocyanates obtained from the halogenolysis of organic isocyanates containing a disulfide group in the molecule and represented by the following general formula:

X—S—R—NCO wherein X and R are defined above, are reacted with high molecular weight unsaturated organic compounds. In the formation of these high molecular weight isocyanates, the sulfenyl halide isocyanates, or substances capable of yielding these isocyanates, are added to the high molecular weight compounds across the olefinic or acetylenic C—C bonds. These unsaturated high molecular weight compounds must be free of functional groups which will react wih free or masked NCO groups at low temperatures.

Any suitable unsaturated high molecular weight compound having a plurality of olefinic double bonds or acetylenic triple bonds and a means molecular weight of at least 1000 may be used. These high molecular weight compounds include substances generally prepared by polyaddition, polycondensation, polymerization or from natural products. However, they must be devoid of reactive hydrogen atoms as determined by the Zerewitinoff method, but must contain either in the principle or in the side chains, if persent, a plurality of olefinic C—C double bonds or C—C triple bonds. It is essential that the high molecular weight unsaturated compounds be substantially free of any functional groups which would react with free or masked NCO groups. Examples of these high molecular weight compounds are modified linseed oils, polyesters which contain olefinic or acetylenic C—C bonds, in the acid or alcohol moiety copolymers of saturated and olefinically-unsaturated aldehydes, possibly masticated natural rubber and gutta-percha, homopolymers of such diolefines as butadiene, isoprene or chloroprene and their copolymers, polymers and copolymers of acrylic esters, methacrylic esters, styrene, dichlorobutadiene and acrylonitrile.

Suitable polyesters include: maleic and fumaric acidglycol polyesters, polyesters formed of adipic acid, phthalic acid and/or terephthalic acid with ethylene glycol and glycerol monoallyl ether, butene- and butine-diol; in addition, isocyanate-modified polyesters incorporating olefinically unsaturated polycarboxylic acids, polyols or polyamines can also be used.

The process of the invention can be carried out in a particularly advantageous manner with polymers which have been prepared by the polymerization of diolefines, possibly in admixture with monoolefines in the solvents mentioned, under substantially anhydrous conditions.

Specific examples include: butadiene homopolymers, homopolymers of 2-chlorobutadiene and isoprene as well as their copolymers, their copolymers with styrene and vinylbenzene derivatives, such as alpha-methyl-styrene, which incorporate the sytrene as a block or statistically, copolymers of alpha-olefines such as ethylene and propylene with cyclic or non-cyclic unconjugated di- or polyolefines, such as dicyclopentadiene, norbornadiene and hexadiene-1,5, copolymers of isobutylene with isoprene and copolymers of epoxides with allyl-glycidylethers.

The reactants may be reacted in the absence of a solvent. However, it is preferred that they be reacted in the presence of an inert organic solvent to moderate the reaction between the reactants. These solvents also aid in controlling the exothermic reaction between the sulfenyl halide isocyanates and the unsaturated organic compounds. In cases where a solvent is desired, saturated aliphatic and aromatic solvents such as those used in the preparation of the sulfenyl halide isocyanates may be employed. Other organic solvents such as chlorinated hydrocarbons and ethers may be used. In general, any solvents which do not, or at least do not appreciably react with SCl groups, the isocyanate or isocyanate-donor group may be employed in this process. It is preferred that the solvent be substantially free of impurities such as water, alcohols and carboxylic acids.

The proportion of the reactants can be varied over a wide range. That is, both of the reactants can be used in equimolar proportions, or either the sulfenyl halide isocyanates or the unsaturated organic polymer can be used in excess depending upon the product desired and its intended application. The ratio of the number of multiple bonds in the high molecular compound to the molar quantity of sulfenyl halide isocyanate may be in the range of from 1:1 to 10,000:1.

The reaction between the sulfenyl halide isocyanate and the high molecular weight compound takes place almost quantitatively and essentially without side reactions at temperatures of from about −50 to about +200° C., preferably from about −20 to about +80° C. with thorough mixing of the reactants by means of a suitable apparatus, such as stirrers or kneaders. The pressure employed is usually atmospheric, but can be as high as 5000 p.s.i. and higher.

The term "isocyanate donors" as used herein refers to reaction products of isocyanates with masking compounds which decomposes at elevated temperatures, reforming the starting substances. Suitable masking components include, for example, hydrocyanic acid, phenols and diethyl malonate.

Many of the isocyanate containing polymers obtained from the process according to this invention are substances which can be obtained as pure highly viscous, rubber-like or as solid high molecular weight compounds. These polymeric materials may be separated from the solvents by suitable purification processes such as vacuum distilaltion, crystallization, filtration and the like. It is preferred that these polymeric materials be used in the form of their solutions.

The invention is further illustrated but is not intended to be limited by the following examples in which all parts and percentages are by weight unless otherwise specified.

EXAMPLE 1

*Preparation of sulfenylchloride isocyanate*

Approximately 600 parts (2 mols) of 4,4′-bis-isocyanatodiphenyldisulfide (M.P. 58–60° C.) are dissolved in about 4,780 parts of carbon tetrachloride. Approximately 145 parts (4 grams atoms) of chlorine are introduced at 0 to 10° C. in the course of about 80 minutes. The mixture is then stirred for an additional 20 minutes at room temperature and the solvent is then removed using a water jet vacuum at a bath tempearture of 50 to 60° C. Approximately 730 parts (theoretical 740 parts) of 4-isocyanato-phenyl-sulfenyl-chloride was recovered as a red colored liquid, B.P.$_{1.5}$ mm. 127–130° C.

EXAMPLE 2

*Preparation of sulfenyl chloride isocyanate*

A solution of about 300 parts (1 mol) of crude, non-recrystallized 4,4′-diisocyanato diphenyldisulfide in about 797 parts carbon tetrachloride is treated without external cooling for about 50 minutes with about 135 parts (1 mol) of sulfuryl chloride in about 240 parts carbon tetrachloride. The reaction which is only slightly exothermic sets in which evolution of $SO_2$. The reaction is completed in about 30 minutes by increasing the temperature to about 70° C. and the solvent is then removed. Distillation of the residue yields 320 parts (86.5% of theoretical) of 4-isocyanatophenylsulfenyl chloride having a B.P.$_{0.2}$ mm. of 86–88° C.

EXAMPLE 3

*Preparation of the sulfenyl chloride isocyanate*

A suspension of about 10.4 parts (0.05 mol) of phosphorus pentachloride in about 96 parts of carbon tetrachloride is treated with a solution of about 15 parts (0.05 mol) of 4,4′-diisocyanatodiphenyldisulfide in about 48 parts of carbon tetrachloride and heated for about 10 minutes to a temperature between about 50° C. to about 60° C. The almost homogeneous pale brown solution formed is clarified with charcoal, freed from more volatile constituents using a water-jet vacuum and the 4-isocyanatophenylsulfenyl chloride thus obtained is then distilled.

EXAMPLE 4

*Preparation of sulfenylchloride isocyanate*

Approximately 300 parts of 2,2'-diisocyanatodiphenyl-disulfide is contacted with chlorine as in Example 1. An 82% theoretical yield of 2-isocyanato-phenylsulfenyl chloride is obtained having a B.P.$_{0.4}$ mm. of 83–87° C.

EXAMPLE 5

*Preparation of sulfenylchloride isocyanate*

Approximately 71 parts chlorine are introduced in the course of about 2 hours into a melt of about 300 parts (1 mol) of 4,4'-diisocyanato-diphenyldisulfide at a temperature of between about 55° C.–65° C. Approximately 295 parts of a product (79.5% of theoretical) which was identified as 4-isocyanato-phenylsulfenyl chloride having a B.P.$_{1.0}$ mm. of 104–106° C. was recovered.

EXAMPLE 6

*Preparation of sulfenylbromide isocyanate*

A solution of about 15.9 parts of bromine in about 159.5 parts carbon tetrachloride is added at a temperature of between about 25° C. to 30° C. to a solution of about 30 parts 4,4'-diisocyanato-diphenyldisulfide in about 112 parts carbon tetrachloride and then heated to boiling for 4.5 hours. After clarification with charcoal, the filtrate is concentrated by evaporation and distilled. The distillate which has a B.P.$_{0.3}$ mm. of between 92° C. to 105° C. shows the characteristic bands of sulfenyl chloride in the IR spectrum.

EXAMPLE 7

Approximately 30 parts of 1,4-cis-polybutadiene, prepared with the aid of an organometallic mixed catalyst, containing about 0.3% by weight of a phenolic anti-aging preservative as stabilizer and which has a mean molecular weight corresponding to a Mooney value of $ML4'=30$ and a Defo value of 260/5, are dissolved in about 900 parts of absolute toluene. A solution of about 1.4 parts of 1,4-phenylisocyanatesulfenyl chloride in about 50 parts of toluene is added while stirring. The yellow color of the sulfenyl halide disappears within a few minutes at room temperature and addition is complete after about 20 minutes, even at temperatures below room temperature. Following this, about 2.0 parts of diethylene glycol monomethyl ether are added and the whole is heated at 50° C. for one hour. The polymer is then isolated by introducing the reaction mass into boiling water.

The product now has a Mooney value of 47 and a Defo value of 740/35 and shows a very good intrinsic adhesiveness.

EXAMPLE 8

Approximately 100 parts of a copolymer prepared in solution from about 98 parts of isobutylene and about 2 parts of isoprene are dissolved in about 1500 parts of dry carbon tetrachloride and are mixed with a solution of about 5 parts of 1,4-phenylisocyanatesulfenyl chloride, dissolved in about 10 parts of carbon tetrachloride. The addition of the sulfenyl chloride is complete within about 20 minutes and can be recognized by the formation of a uniform, wide-meshed gel on addition of about 3.5 parts of hexamethylene diamine.

EXAMPLE 9

Approximately 1000 parts of isoprene (99.6% pure) were polymerized in about 7000 parts of n-hexane with lithium butoxide as catalyst; the amount of catalyst was such that polyisoprene with a Mooney value of $ML4'=29$ was formed.

Portions of 800 parts of the polyisoprene solution are mixed while stirring at 20° C. with the amounts of 1,4-phenyl-isocyanate sulfenyl chloride indicated in Table 1, dissolved in about 80 parts of n-hexane. The yellow color of the sulfenyl chloride disappears in a few minutes. After 15 minutes, the alcohols or amines indicated in Table 1 are added and the mixture is stirred for one hour at 50° C. The polymer is then precipitated with methanol which contains about 0.5 part of di-tert-butyl-p-cresol, and dried in vacuo.

TABLE I

| Parts of Sulfenyl Chloride | Parts by Weight, A—H | Mooney ML 4' |
|---|---|---|
| 5.0 | 11.0, A=CH$_3$O— | 130 |
| 2.5 | 6.0, A=CH$_3$(OCH$_2$—CH$_2$)$_2$O— | 42 |
| 1.0 | 3.0, A=CH$_3$(OCH$_2$—CH$_2$)$_2$O— | 35 |
| 2.0 | 12.0, A=CH$_3$(O—CH$_2$—CH)$_5$O—<br>$\quad\quad\quad\quad\quad\quad\quad$ $\mid$<br>$\quad\quad\quad\quad\quad\quad\quad$ CH$_3$ | 106 |
| 0.8 | 5.0, A=CH$_3$(O—CH$_2$—CH)$_5$O—<br>$\quad\quad\quad\quad\quad\quad\quad$ $\mid$<br>$\quad\quad\quad\quad\quad\quad\quad$ CH$_3$ | 72 |
| 1.0 | 3.0, A=CH$_3$O(CH$_2$)$_3$NH— | 53 |

EXAMPLE 10

Portions of 900 parts of a 10% by weight solution of a butadiene-styrene block polymer in toluene are reacted, as in Example 9, with 1,4-phenylisocyanate sulfenyl chloride and then with the compounds indicated in Table II. The resulting polymer is isolated and the Mooney values determined.

These polymers are highly suitable for processing into mixtures with light-colored fillers, which can then be formed into soles, profiles and similar rubber articles.

TABLE II

| Parts of Sulfenyl Chloride | Parts by Weight, A—H | Mooney ML 4' |
|---|---|---|
| | | 18 |
| 2.7 | 8.0, A=CH$_3$O— | 30 |
| 2.7 | 6.0, A=CH$_3$(OCH$_2$—CH$_2$)$_2$O— | 41 |
| 0.9 | 4.5, A=CH$_3$(OCH$_2$—CH)$_5$O—<br>$\quad\quad\quad\quad\quad\quad\quad$ $\mid$<br>$\quad\quad\quad\quad\quad\quad\quad$ CH$_3$ | 25 |
| 1.9 | 5.5, A=CH$_3$(OCH$_2$—CH)$_5$O—<br>$\quad\quad\quad\quad\quad\quad\quad$ $\mid$<br>$\quad\quad\quad\quad\quad\quad\quad$ CH$_3$ | 53 |
| 1.8 | 3.8, A=CH$_3$(CH$_2$)$_2$NH— | 58 |

This process makes it possible to improve and/or to modify the properties of high polymers containing a plurality of olefinic or acetylenic C—C bonds.

The adhesion of the polymers, prepared according to the invention, to glass and metal can be improved by means of the NCO groups, and the reinforcing effect of fillers can similarly be increased. For example, the dyestuff retention can be increased and the static charge reduced by reacting the NCO groups in the products of the process with monofunctional polyethers, polyesters or other hydrophilic compounds having one reactive hydrogen atom. Adhesive capacity and compatibility with other polymers and fillers can be varied. Thus, the chemical and physical properties of polyester fibers may be modified.

By reaction with bifunctional compounds having reactive hydrogen atoms, e.g. diamines, branched or crosslinked products can be prepared in a novel manner, and these products can be employed as lacquers, films, foils, printing rollers or as impact-resisting plastic materials or as rubbers. The use of isocyanate-donors instead of compounds containing free isocyanate groups in the process according to the invention renders possible a further reaction of the products within a precisely determined temperature range.

From the previous examples it is apparent that the compositions of the invention may be produced by contacting an isocyanate containing a disulfide group in its molecule with a halogen containing compound to form a sulfenyl halide isocyanate which may be subsequently reacted with high molecular weight unsaturated organic compounds to produce a polymer containing isocyanate groups.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for the preparation of polymers containing isocyanate groups which comprises reacting a sulfenyl halide organic isocyanate with a polymer having a plurality of unsaturated C—C bonds substantially free of any functional groups which would react with free or masked NCO groups to form isocyanate containing polymers having isocyanate groups in the molecule.

2. A method for the preparation of polymers containing isocyanate groups which comprises reacting an isocyanato organic sulfenyl halide having the formula $$X-S-R-(NCO)_n$$

wherein R is a divalent organic radical, X is a halogen radical having an atomic number between 17 and 35 inclusive and $n$ is 1 or 2 with an organic polymer having a plurality of unsaturated C—C bonds substantially free of any functional groups which would react with free or masked NCO groups to form isocyanate containing polymers having isocyanate groups in the molecule.

3. The method of claim 1 wherein the unsaturated organic compound contains a plurality of olefinic groups.

4. The method of claim 1 wherein the unsaturated organic compound contains a plurality of acetylenic groups.

5. The method of claim 1 wherein the reaction is carried out at a temperature between about —50° C. and 200° C.

6. The method of claim 1 wherein the polymer contains randomly positioned unsaturated C—C bonds.

7. The method of claim 1 wherein the polymer has a mean molecular weight of at least 1000.

8. The method of claim 1 wherein the sulfenyl halide isocyanate is a sulfenyl halide diisocyanate.

9. The method of claim 1 wherein the reaction is conducted in the presence of an inert organic solvent.

10. The product prepared by the process of claim 2.

11. A method for the preparation of polymers containing isocyanate groups which comprises reacting an isocyanato sulfenyl halide havnig the formula $$X-S-R-NCO$$

wherein R is a divalent organic radical and X is a halogen radical having an atomic number between 17 and 35, inclusive, with an organic polymer having a plurality of unsaturated C—C bonds substantially free of any functional groups which would react with free or masked NCO groups at a temperature of at least —50° C. to form isocyanate containing polymers having isocyanate groups in the molecule.

12. The method of claim 11 wherein R is an unsubstituted arylene group.

No references cited.

JOSEPH L. SCHOFER, *Primary Examiner.*

D. K. DENENBERG, *Assistant Examiner.*